SELECTIVE ADDRESS PRINTER FOR DIAGONALLY FED STRIP

Filed Dec. 1, 1954 8 Sheets-Sheet 1

INVENTOR.
ELMER W. PAPE, JR.
BY Geoffrey Knight
ATTORNEY

INVENTOR.
ELMER W. PAPE, JR.
BY Geoffrey Knight
ATTORNEY

SELECTIVE ADDRESS PRINTER FOR DIAGONALLY FED STRIP

Filed Dec. 1, 1954 8 Sheets-Sheet 3

INVENTOR.
ELMER W. PAPE, JR.
BY Geoffrey Knight
ATTORNEY

SELECTIVE ADDRESS PRINTER FOR DIAGONALLY FED STRIP

Filed Dec. 1, 1954 8 Sheets-Sheet 4

INVENTOR.
ELMER W. PAPE, JR.
BY Geoffrey Knight
ATTORNEY

INVENTOR.
ELMER W. PAPE, JR
BY Geoffrey Knight
ATTORNEY

SELECTIVE ADDRESS PRINTER FOR DIAGONALLY FED STRIP

Filed Dec. 1, 1954 8 Sheets-Sheet 6

INVENTOR.
ELMER W. PAPE, JR.
BY Geoffrey Knight
ATTORNEY

SELECTIVE ADDRESS PRINTER FOR DIAGONALLY FED STRIP

Filed Dec. 1, 1954 8 Sheets-Sheet 7

INVENTOR.
ELMER W. PAPE, JR.
BY Geoffrey Knight
ATTORNEY

INVENTOR.
ELMER W. PAPE, JR.
BY Geoffrey Knight
ATTORNEY

United States Patent Office 2,850,968

Patented Sept. 9, 1958

2,850,968

SELECTIVE ADDRESS PRINTER FOR DIAGONALLY FED STRIP

Elmer W. Pape, Jr., Vestal, N. Y., assignor to International Business Machines Corporation, New York, N. Y., a corporation of New York Application December 1, 1954, Serial No. 472,348

6 Claims. (Cl. 101—93)

This invention relates generally to a method and means for printing addresses on a strip of record material. In a preferred embodiment of the invention, the addresses are printed on a strip under control of a printing tabulator through which are passed tabulating record cards bearing name and address data.

In large business establishments employing mechanized card controlled accounting systems, it is customary to have the name and address cards separate from the so-called transaction or detail cards which bear information concerning a particular item of sale or service rendered. Periodically bills are prepared for the consumer and the procedure in general entails the sorting and merging of the detail cards with related name and address cards and thereafter passing them through card controlled printing tabulators of the type wherein a single line of printing impressions is obtained for each machine cycle of operation.

The bill is prepared by listing the name and address parts in the so-called heading section and listing the detail data in the body section. Along with the detail listing of data, the machine is undergoing the various calculations associated with each transaction so as to obtain the necessary total charges. Because of the fact that the printing line in these particular billing procedures is relatively wide and that it includes the calculations, the single line of printing for each machine cycle is justifiable. However, such speeds would be too slow for producing address strips used for mailing purposes. Therefore, while it is desirable to use the system of name and address cards already in existence for an additional purpose, it is even more desirable to provide some way of speeding the preparation of addresses per se particularly when the address has no particular relation to the processing of numeric accounting data. For that purpose there has been provided the invention described in a copending application to J. J. Nolan, Serial No. 324,563, filed December 6, 1952, now U. S. Patent No. 2,770,188.

In said Nolan application means are provided whereby three or four address lines may be printed simultaneously from a succession of record cards through the full utilization of the entire range of print capacity of a machine such as a tabulator which ordinarily includes from 100 to 120 separately adjustable printing members arranged in a single line across the width of the printer unit of the machine. The full employment of the printing members is made possible as described in said Nolan application by subdividing the 120 positions of printing across the tabulator into equally spaced groups and using them simultaneously for separate address parts of different addresses, such as printing the name of one, the street identification of a second and the city and state identification of a third. In order to accomplish this, the narrow address strip or tape is arranged diagonally across the printing line with the strip length running along the length of the printing line and within the range of the full width of the printer unit and arranged so that the several different portions of impressions fall along the length of the strip and on different line space portions. The angle of inclination of the strip from the horizontal is such that when the strip is advanced a space equivalent to the spacing of the separated groups of the aligned type members, the printed address line of one portion is not only advanced but also elevated one line space with respect to the printing line. Therefore, while the strip is only advanced the length of one address portion for each cycle, it has printed thereon three, four or more address lines simultaneously on several adjoining tags or portions and thus the printing of a multiple line address portion or tag is completed on each tabulator printing cycle with a gain of time which is threefold or more. It must however, be realized that the addresses produced in this manner in accordance with the above-mentioned Nolan application are a product based upon a conventional method in which the various parts of an address are written in a prescribed order, namely, name, street and number, and finally city and state. In accordance with this conventional method, the preparation of addresses on tabulating machines involves complex controls and excessive storage facilities.

In accordance with the present invention, a novel method of preparing addresses is employed wherein the above-mentioned prescribed order for printing the various parts of an address is reversed, that is to say, that the last part of an address is printed first and the first part is printed last. The strip upon which printing takes place is fed across the printing members in a diagonal manner but the slope thereof is opposite to that employed in the Nolan application, so that with each advance of the strip across the printing members the printed portion is displaced donwardly one line space relative to the printing line. In the Nolan application this displacement is upward.

Accordingly, it is the principal object of the invention to employ a novel method of printing addresses whereby complex controls and storage facilities heretofore necessary are eliminated.

Another object resides in the provision of a novel printing scheme whereby related functions may be combined therewith and effected in an economical manner.

Yet another object resides in the provision of a novel address printing scheme whereby name contracting functions may be simultaneously effected therewith in a most expeditious manner.

Other objects of the invention will be pointed out in the following description and claims and illustrated in the accompanying drawings, which disclose, by way of examples, the principle of the invention and the best mode, which has been contemplated, of applying that principle.

Figure 7A:
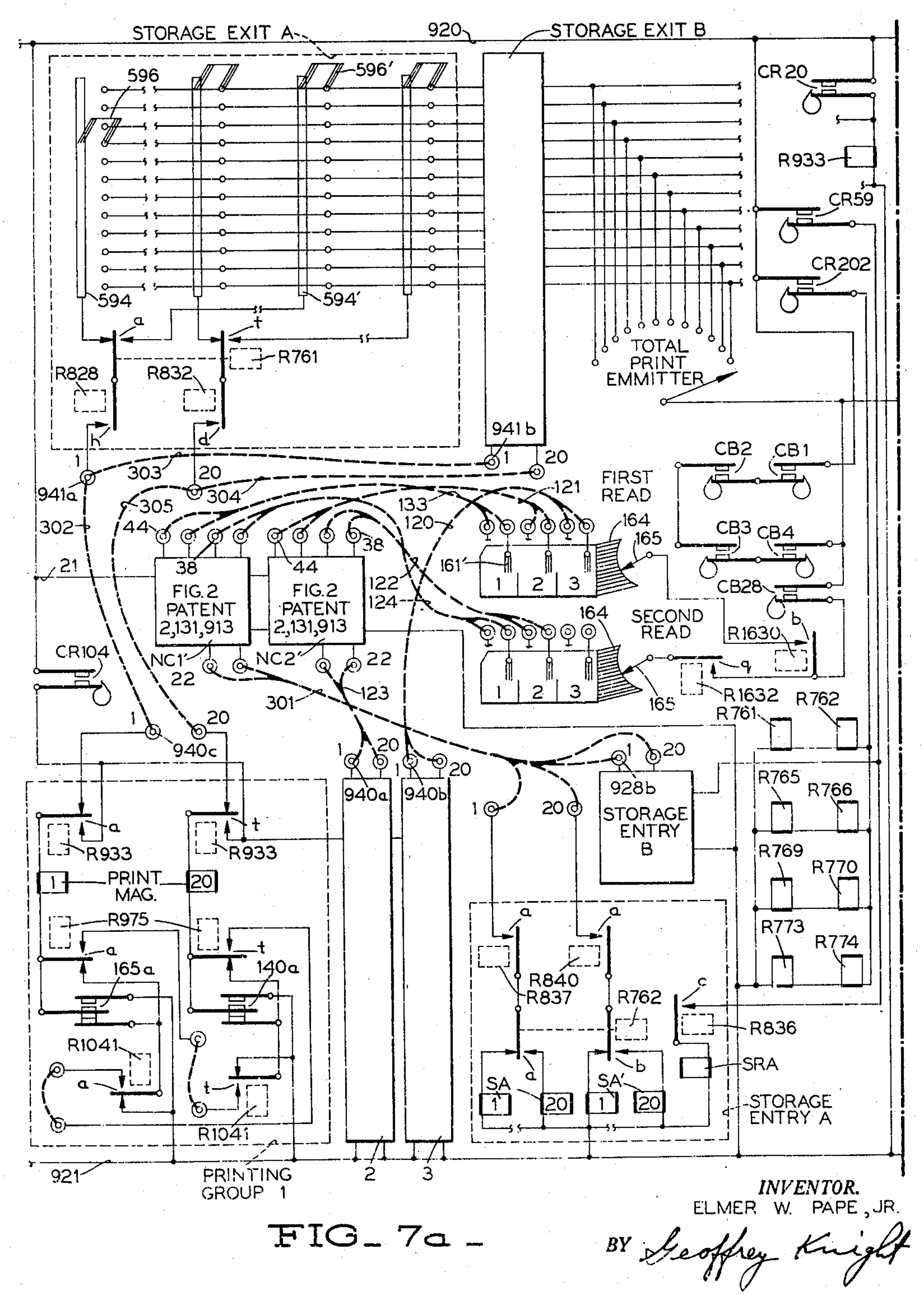
Figure 7B:
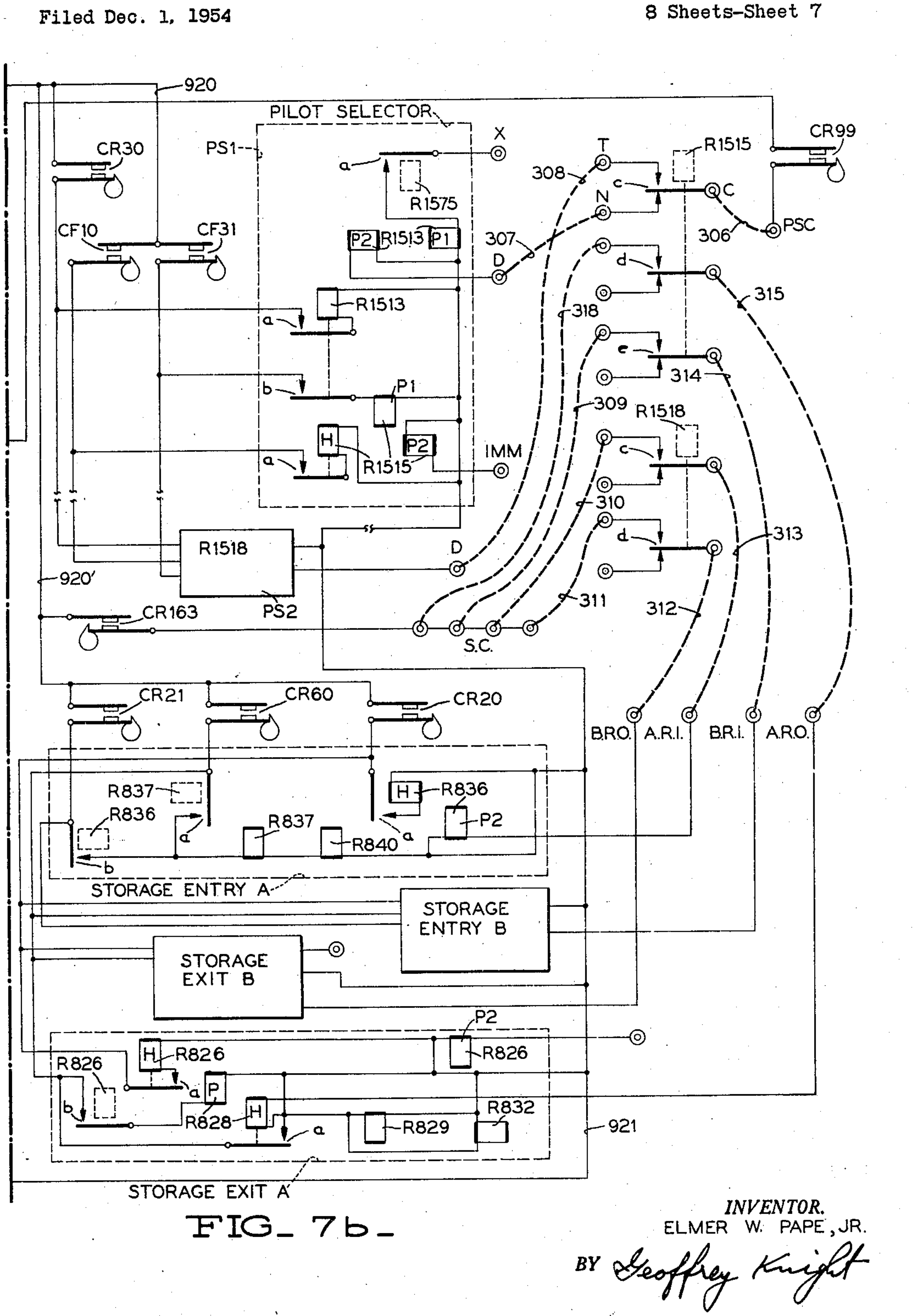

Figs. 7a and 7b, when taken together, constitute a circuit diagram.

Figure 8:
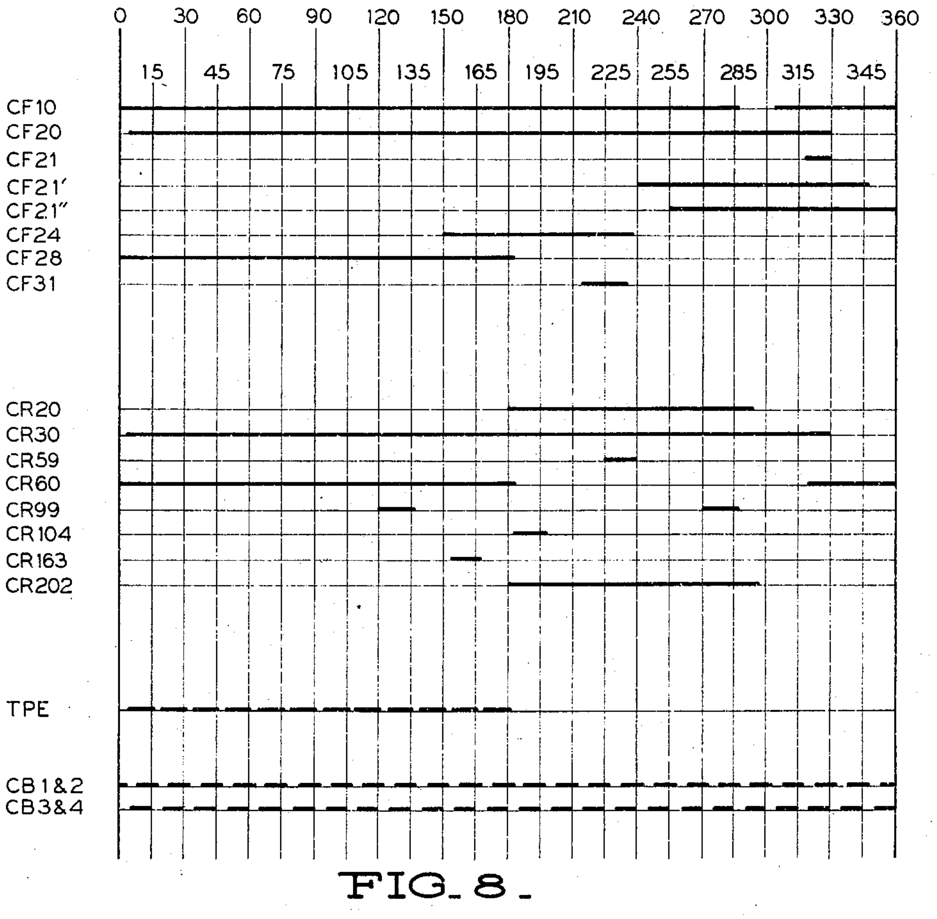

Fig. 8 is a time chart.

For the purposes of illustration, the invention is shown in connection with an alphabet printing tabulator of the kind disclosed in the patent to Rabenda, No. 2,569,829, filed May 3, 1949, and issued October 2, 1951. This patent illustrates the main components of a tubulator known as the IBM "407" alphabet printer with storage. Heretofore, it was used primarily for printing addresses and accounting data on wide record material advanced vertically with respect to the printing unit. Also of note is the copending Beattie et al. application, Serial No. 74,424, filed on February 3, 1949, for a record controlled printing machine, now U. S. Patent No. 2,687,086.

Figure 1:
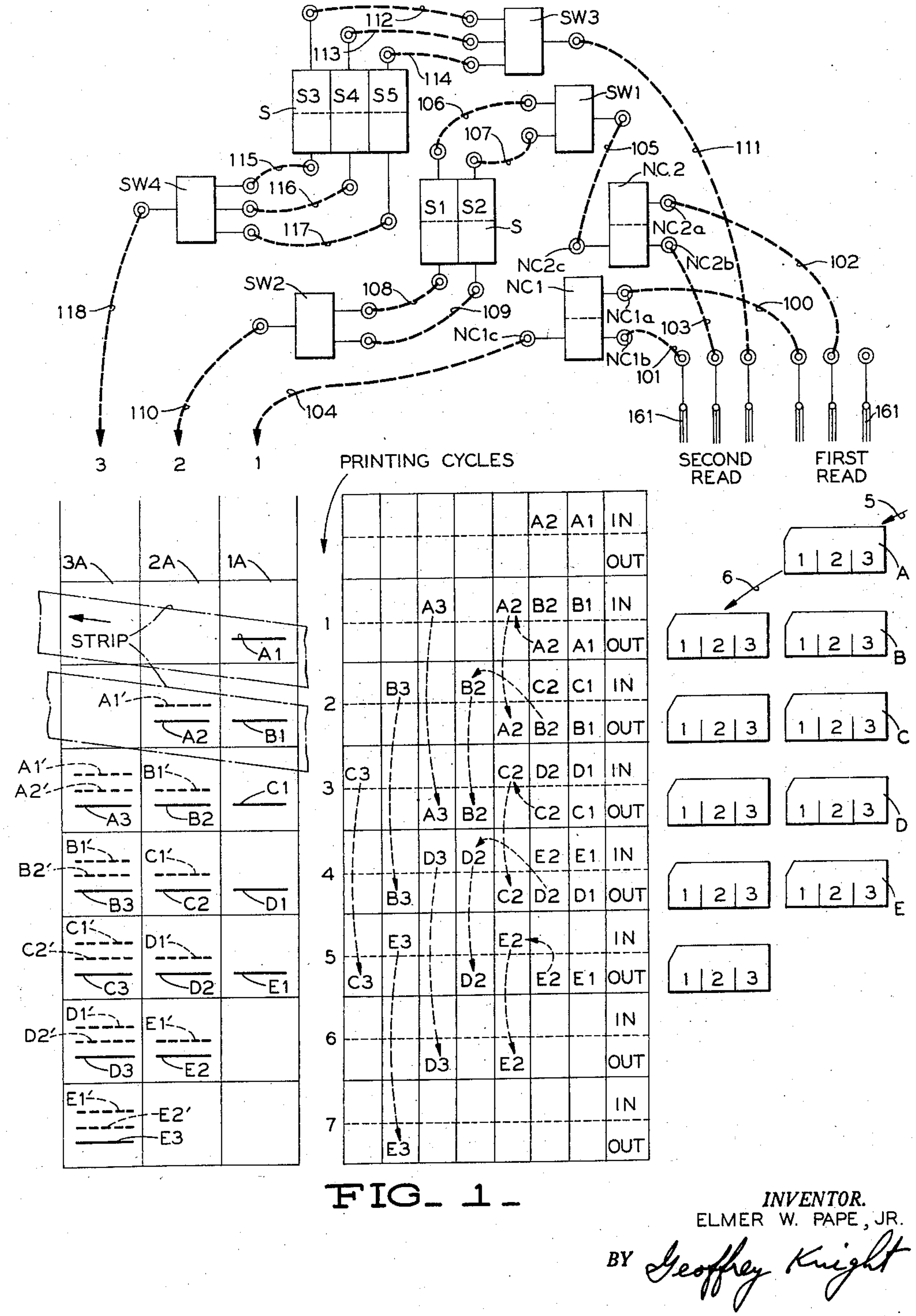
Fig. 1 is a diagrammatic view of the general organization of the means for printing a succession of addresses in contracted form on a strip in accordance with the conventional method of printing the various parts of an address.

Fig. 1 of the Nolan application, Serial No. 324,563, filed December 6, 1952, shows a narrow strip of address receiving material advanced diagonally across the platen and behind an inking ribbon arranged in the usual fashion parallel and coincident with the printing line across the printer of the tabulator in front of a plurality of separately adjusted type wheels of the printer. These type wheels are subdivided into several groups, each group involving wheels equal in number and equally spaced by the omission of control from the printer wheels interspersed between the different groups so that blank spaces result between the address portions. Perforated records each containing a complete address are fed successively out of a magazine and through a presensing station and successively through a first reading station, a second reading station and then to a stacker. This is all described in detail in the Rabenda patent and it is sufficient to state that when the record card appears at the first reading station the electrical sensing devices therein cooperate with the card portion devoted to name data perforated therein and such sensing portions are connected to the first group of address printing members for printing the name. When the same card advances into the second reading station, there are two portions of the card read; the first portion is read into the second group of printing members to indicate the middle part, that is, the street part of the address, while the third card portion relating to city and state is directed into one of two storage devices. The last-mentioned data is read out of storage on the following cycle to print the city and state from the third group of printing wheels.

The instant invention is capable not only of preparing addresses at high speed but also preparing the same in contracted form with much greater economy and simplicity in controls than have heretofore been realized.

Figure 4:
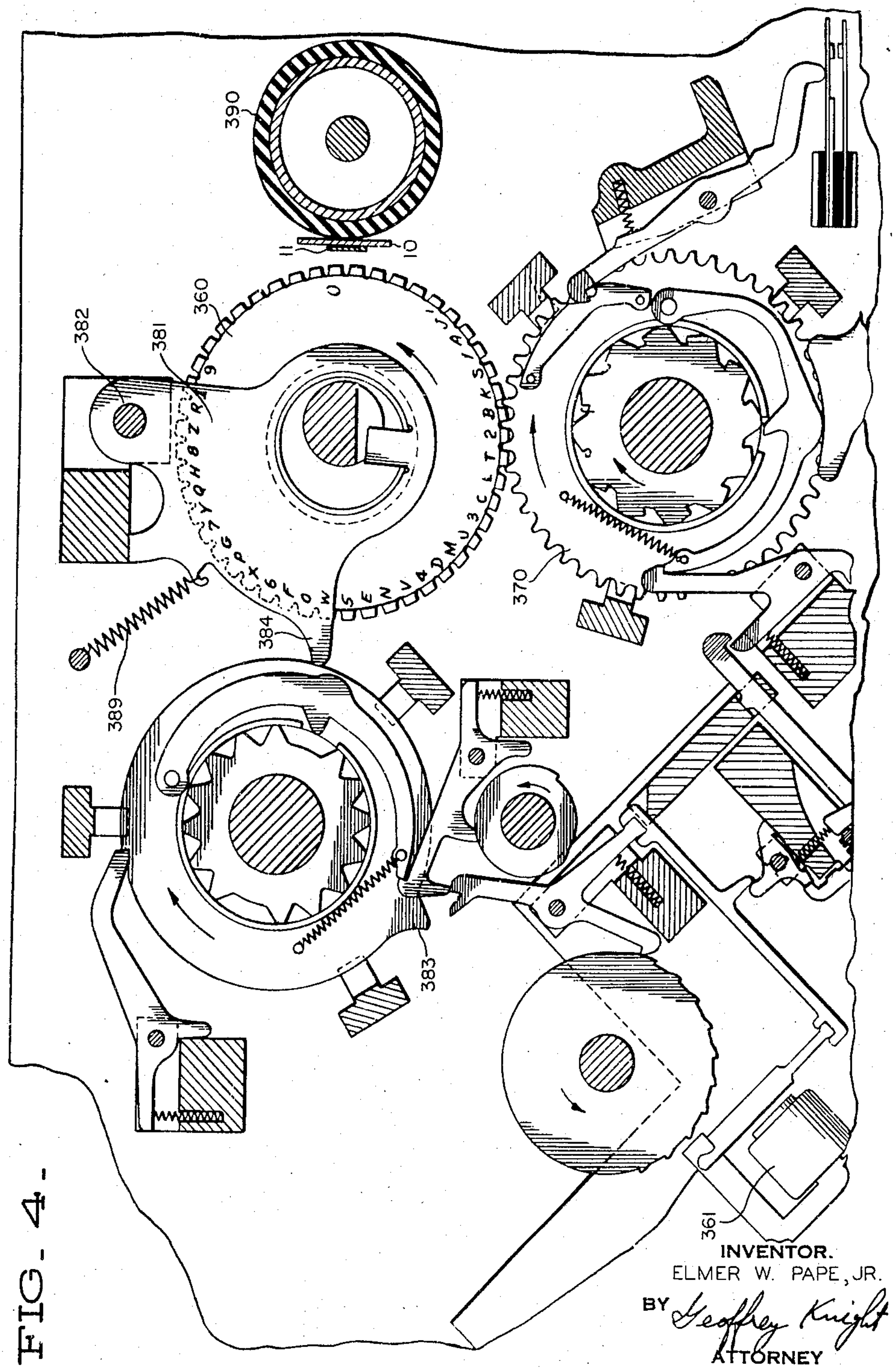
Fig. 4 is a sectional elevation view showing the printing mechanism as it is associated with the inking ribbon, address strip and platen.
Figure 3:
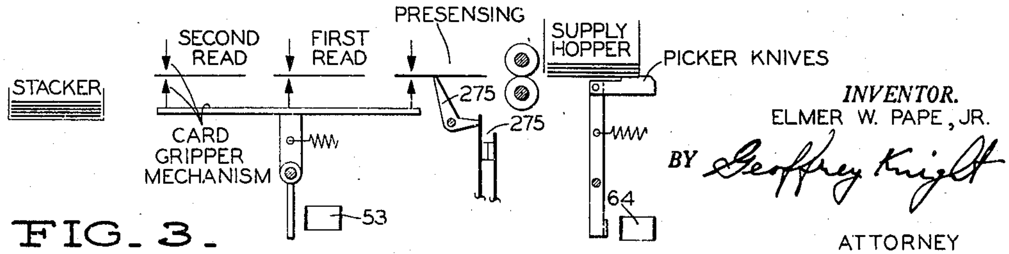
Fig. 3 shows in diagrammatic form the feed of the tabulator.

The name contracting feature per se is old and is somewhat of the type shown in the patent to J. W. Bryce, No. 2,131,913, granted October 4, 1938. It may be appreciated that by virtue of the invention and the necessity of utilizing efficiently the area of a strip that the need arises for combining a name contracting feature with address printing on a narrow strip. Briefly, the name contracting feature provides a shifting device between the record card sensing mechanism and the columns of printing devices of the tabulating machine to cause surnames and the first names to be printed with a normal spaced relationship. For the purpose of the present invention, this contracting feature is set up for operation when a particular address card passes through the first read station of the tabulator and then it is effective on the following cycle when the same address card passes through the second read station, to provide the printing means with a name or any other data in contracted form. In Figs. 3 and 4 of said Bryce patent, it may be appreciated that the spaces in the card between the surname and the first name varies with each address card. By employing the name contracting feature, these variations in spacing are eliminated when the name is printed as shown in Fig. 4 of said Bryce patent. For the sake of simplicity, the name contracting feature is shown in the present application in diagrammatic form and operates in the manner explained hereinabove.

In order to appreciate the merits of the instant invention, it will be necessary to explain first the general mode of operation of address printing based upon the conventional method mentioned and thereafter explain the general mode of operation of address printing based upon the instant invention.

*General mode of operation of conventional printing*

Referring to Fig. 1 of the instant application, there is shown in diagrammatic form the general organization of the means for printing a succession of addresses on a strip which is moved diagonally from right to left across the printing line of a tabulator of the type such as the 407 mentioned hereinabove. For illustrative purposes, the printing instrumentalities of this 407 machine are divided into three groups represented by the three vertical columns 3, 2 and 1 on the left-hand side of the drawing. These vertical columns 3 to 1 are further divided by horizontal lines to represent seven printing cycles of the tabulator. Thus, each printing cycle is represented by a horizontal row of three rectangles such as 3A, 2A, 1A and within each rectangular box there are to be noted short horizontal lines, one of which is a solid line whereas the others are broken lines. The solid line indicates a line of address which has just been printed on the strip in a particular cycle in progress, whereas the broken lines indicate the lines of addresses which have been printed on cycles prior to the cycle in which printing has just been completed. The strip is shown only for the first two cycles so as to avoid showing unnecessary lines. The three printing groups, namely, 3, 2 and 1, will accommodate addresses from one to three lines inclusive. The first line of an address is printed by group 1, line 2 by group 2 and line 3 by group 3.

On the right-hand side of Fig. 1 there are seen two vertical rows of record cards, representative of a single deck which is passed through the feed of the 407 printing tabulator described in the aforementioned Rabenda patent and diagrammatically shown in Fig. 3 of the instant application. The top of the extreme right-hand column represents the first read station of the 407 feed unit whereas the top of the next column to the left represents the second read station of the 407 feed unit. The cards are passed singly and successively from the feed magazine to a presensing station and then through the first read and then the second read and finally deposited in the stacker of the feed. For the particular purpose at hand, we need only show the first and second read portions of the feed and the sequence of passing the cards through the first and second read stations begins with the card which is indicated by the arrow 5; this is the first card entering the first read. Following this the card proceeds to the second read indicated by the arrow 6. Thus, in the first cycle shown the first address card is positioned in the first read and on the following cycle, cycle 2, the first card occupies the second read while the second card of the deck now occupies the first read.

It is to be noted that each card is divided into three fields numbering 1, 2 and 3. Field 1 represents the name, field 2 the street and number and field 3 the city and state.

Although details of the cards are not shown, they are of a type shown in the patent to C. D. Lake, No. 1,772,492, granted August 12, 1930. In general, the card has perforations, not shown, which are arranged in vertical columns and in horizontal rows, through which perforations electrical circuits are made to control functions of the machine.

The columns of alphabetic characters A through E to the right of the cards represent five different addresses.

Now in accordance with the conventional method of printing addresses, the problem of processing the data, constituting the various addresses, through the tabulator to obtain a strip of printed addresses is somewhat complex. As part of the problem, fields 1 and 2 of each address require contraction and must therefore be processed through associated name contraction devices. Field 3, on the other hand, may be printed directly from the card since the latter is recorded in the card in contracted form. The name contracting devices are shown in block form and labeled NC1 and NC2, respectively. The former functions to contract field 1, the name, while the latter functions to contract field 2, the street and number. Each name contracting device is provided with plug sockets. In the case of NC2 the sockets are labeled NC2*a*, NC2*b* and NC2*c*. For NC1, the associated sockets are labeled NC1*a*, NC1*b* and NC1*c*.

The name contracting devices are controlled by means of plug wires 100, 101, 102 and 103 connected to sensing brushes 161 of the card feed. It must be understood that in this diagrammatic representation a single plug wire is used to illustrate what in reality represents a plurality of plug wires. Plug wires 100 and 102 establish connections whereby fields 1 and 2 in the cards are analyzed by the name contracting devices whereby the latter are adjusted accordingly. Plug wires 101 and 103, respectively, enable the same fields 1 and 2 to be sensed on the immediate following cycle and the data corresponding thereto be fed through the now adjusted name contracting devices. The data emerges in contracted form from the plug sockets NC1*c* and NC2*c*, respectively. From the NC1*c* plug socket the name is transmitted by means of plug wire 104 to the printing group 1 where on successive printing cycles the names as represented by the lines A1 through E1 are printed. Returning to device NC2, the street and number corresponding to field 2, will emerge in contracted form from plug socket NC2*c*. Because of the required delay in the printing of the street and number, the latter must be placed in storage.

To this end there is provided a two-way storage unit S comprised of two sections, S1 and S2, alternately controlled for input and output operations by means of switching devices S1 and S2, respectively. The plugging associated with the transmission of the street and number data from the plug socket NC2 to the printing group 2 including plug wires 105, 106, 107, 108, 109 and 110. Under printing group 2 it will be seen that on successive printing cycles the street and number, represented by lines A2 through E2, will be printed. The need for the switches and storage will be explained in detail later on in the ensuing parts of the specification.

Figure 2:
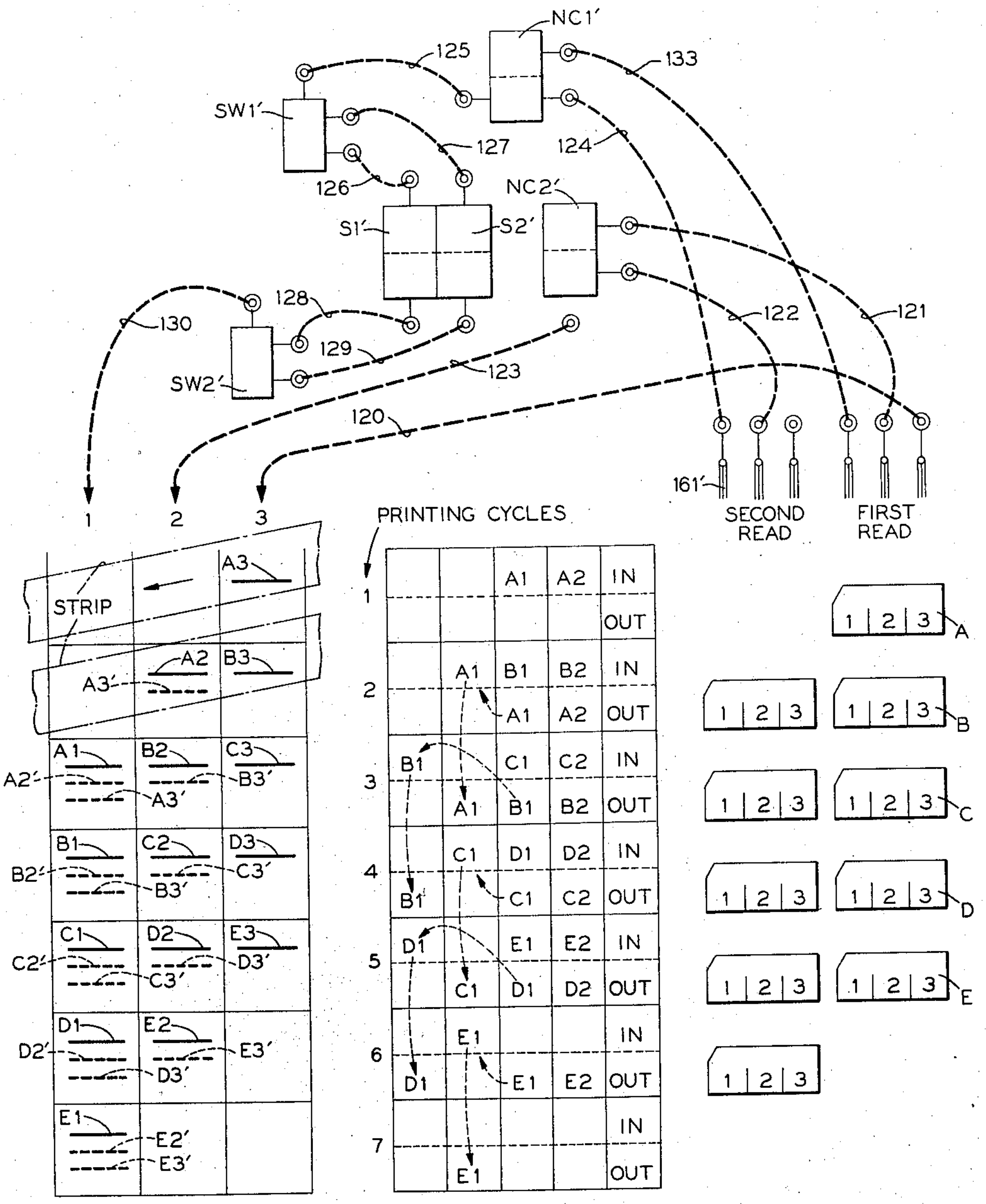
Fig. 2 is a diagrammatic view of the general organization of the means for printing the same succession of addresses in contracted form on a strip in accordance with the present invention.

It is further to be understood that in this representation of Fig. 1 the arrangement of switches and storage device is purely diagrammatic and is made so merely to provide a convenient manner for understanding the operations and to provide a basis for comparing the storage and switching facilities shown in Fig. 2. The more exact arrangement of the storage and the switching controls is shown in Figs. 7*a* and 7*b*.

In the printing of the city and state which corresponds to field 3 of the card, it is not necessary to process this information through the name contracting devices as was mentioned earlier. Because of the delay from the time that field 3 is sensed to the time when it is printed is the reason why a three-way stroage unit comprising sections S3, S4 and S5 is required. This storage unit is controlled by three-way switches SW3 and SW4, respectively, the former controlling the input to the storage while the latter controls the output therefrom. The path employed for transmitting the city and state data from the card to the printing group 3 begins with plug wire 111 connected to switch SW3 from which the data emerges along plug wires 112, 113 and 114 to the appropriate sections of storage, namely, S3, S4 and S5. From these sections the data flows through plug wires 115, 116 and 117 and into the switch SW4. The data emerges from the latter along plug wire 118 to the printing group 3, whereon successive printing cycles the city and state as represented by lines A3 through E3 will be printed.

The manner of controlling the various switches, storage units, and name contracting devices is diagrammatically shown in a chart occupying a portion of the Fig. 1 located between the areas designating printing group 3 and second read. The chart comprises 8 vertical columns and 8 horizontal rows to indicate the status of the storage units S1, S2, S3, S4 and S5 and the name contracting devices NC1 and NC2 for 8 tabulator cycles. Each horizontal row is subdivided by a broken line. On the extreme right-hand column printed indications of In and Out are shown above and below each broken line. The indications indicate respectively read-in and readout operations. The first three columns reading from left to right correspond to the storage sections S3, S4 and S5, respectively. The next two columns correspond to storage sections S1 and S2, respectively. The last two columns correspond to the name contracting devices NC2 and NC1, respectively.

Referring now to the activity within the chart, it is seen that in the first machine cycle the data comprising A1 and A2 are read into NC2 and NC1. On the next succeeding cycle, printing cycle No. 1, data A3 enters storage section S5, B2 enters NC2 and B1 enters NC1. In the same cycle A1 passes through NC1 and prints on the strip, data A2 passes through NC2 and into storage section A2 which operation is indicated on the chart by a broken arrow. Data A2 is retained in storage until released on printing cycle 2. After the first printing cycle, the strip is advanced in the direction indicated a distance equivalent to the distance from one point of printing group 1 to a corresponding point of printing group 2. Thereafter advancement of the strip occurs after each printing cycle. The net result for each printing and spacing operation results in the production of a complete address per each machine cycle after the second run-in cycle.

Referring to the chart again, it is seen that in the processing of the data corresponding to A2, C2 and E2 that in each instance the data passes through NC2 and into storage section S2 where it is retained for one machine cycle. In the case of the data corresponding to B2 and D2, the manner of operation is similar. It may be appreciated that switches SW1 and SW2 provide the necessary alternating controls which enable read-in and readout of the data on alternate machine cycles. In the case of data corresponding to A3, B3 and C3, it may be noted from the chart that a delay of one cycle is interposed between read-in and readout of the data from the respective storage sections S5, S4 and S3. The switching controlling read-in and readout is under the control of switches SW3 and SW4. The details of the latter and the storage units need not be considered since the purpose of illustrating the conventional method of printing addresses as set forth in the above-mentioned Nolan case is merely to give a general idea of the necessary functions and to provide a basis for comparison with the novel method of address printing forming part of the instant invention.

Before presenting the latter method, it may be added that in the operation concerning the spacing of the strip following the printing of the first line of the address, namely, A1, the strip is advanced in the manner described. This advancement causes the printed matter to be displaced upwardly one line space relative to the printing line of the tabulator. It is noted that the broken line labeled A1′ is an indication that the latter was printed on the prior cycle and that in the instant cycle as A2 is being printed A1′ is now one space thereabove. Completed addresses are shown under printing group 3, each address comprising two broken lines and one solid line, for example, A1′, A2′ and A3.

*The new method of printing addresses*

Having presented the method based on the conventional method of printing addresses on a strip, it is now in order to present the method of printing addresses predicated on the present invention. Referring to Fig. 2, there is shown in diagrammatic form a comparatively simplified organization of means for printing the same addresses previously printed by means of the conventional method. Here we note the same address cards, namely, A through E, bearing the same field identifications, namely, 1, 2 and 3. These cards are passed through the feeds of the tabulator and sensed in the manner previously described.

The means in the form of storage, name contracting devices and switches are considerably less in capacity than was required in the illustration of Fig. 1. It may be noted that the organization includes two name contracting devices, namely, NC1′ and NC2′, a storage unit comprising sections S1′ and S2′, and appropriate switches SW1′ and SW2′. Also to be noted is the fact that the strip is sloped downwardly and advanced in the direction of the arrow from right to left. Thus with each advance of the strip, the printed data thereon is displaced downwardly one line space relative to the printing line. It is to be noted that the last line of each address is sensed from the first read station of the card feed and wired directly by means of plug wire 120 to printing group 3. This arrangement provides for printing the last line of the address first, that is, field 3 comprising the city and state portion of the address is printed first. This is indicated as A3 on the strip.

The data recorded in field 2, namely, street and number, is required to be printed in contracted form. Accordingly, it is plugged into NC2′ by means of plug wire 121 from the first read. On the immediate following cycle, this data is conveyed from the second read by way of plug wire 122 through the now adjusted NC2′. From the latter, the data passes through plug wire 123 to printing group 2 where it is noted that the street and number corresponding to each address will be printed in successive printing cycles, the data being represented in solid lines A2 to E2.

The printing of the name portion of each address must also be affected in contracted form, furthermore, it is necessary to store the contracted name because of the delay between the sensing and the printing of this data. The plugging associated with the processing of the name includes plug wires 133, 124 and 125. The latter conveys the name in contracted form to the switch SW1′ which distributes the same alternately through plug wires 126 and 127 to storage sections S1′ and S2′. From these storage sections the name passes alternately through plug wires 128 and 129 into switch SW2′, the latter passing the contracted name by way of plug wire 130 into printing group 1. On successive printing cycles, it is noted that the name of each address is printed, the solid lines A1 through E1 indicating these printing operations.

It is to be further mentioned that following the printing of A3, the strip is advanced across the printing group. This advancement causes the previously printed address portion to be displaced downwardly one line space relative to the printing line, the previously printed data being represented by a broken line and identified with a prime mark as for example A3′. Completed addresses are indicated under printing group 1 and each such completed address comprises one solid line and two broken lines, for example, A1, A2′ and A3′.

In the area of Fig. 2 located between printing group 3 and the second read, there is seen a chart of activity showing the operations of the storage sections S1′ and S2′ and the name contracting devices NC1′ and NC2′. The notations within the chart and the manner of indicating when various address portions are read into and out of each unit is the same as explained in connection with the chart of Fig. 1. It is to be noted that the chart is considerably simpler than that of Fig. 1. The storage and associated complex switching arrangement required for the processing of data associated with field 3 in the illustration of Fig. 1 is entirely eliminated in Fig. 2. The only storage required is that for processing the name. In the chart of Fig. 2 the names are indicated by the alphabetic characters A through E followed by the numeric digit 1. The name A1 for example is read into NC1′ on the first machine cycle, on the second machine cycle A1 passes out of NC1′ and into storage section S2′ (the latter operation being identified by an arrow in the chart) where it will remain until released on the following cycle for printing in printing group 3. The names corresponding to C1 and E1 are processed in a like manner. The names corresponding to B1 and D1 are similarly controlled except that they are processed through storage section S1′. Having explained and compared the merits of both printing methods, it is now in order to explain the details of the printing mechanism, the storage sections S1′ and S2′ and the switching control devices.

*The printing means*

The printing devices diagramatically shown in Figs. 1 and 2 are of the type found in the above-mentioned Patent 2,569,829. Referring to Fig. 4 it is seen that the printing wheels 360 are individually mounted to swing from pivot 382 and be adjusted by gear 370 before being swung to the right against platen 390 to effect a typed impression through the ink ribbon 11 and upon the dick strip 10. The printer control magnets 361 are energized differentially to control the positioning and shifting of the type wheels 360 through the mechanism associated therewith and described in detail in the patent.

*The storage means*

Figure 5:
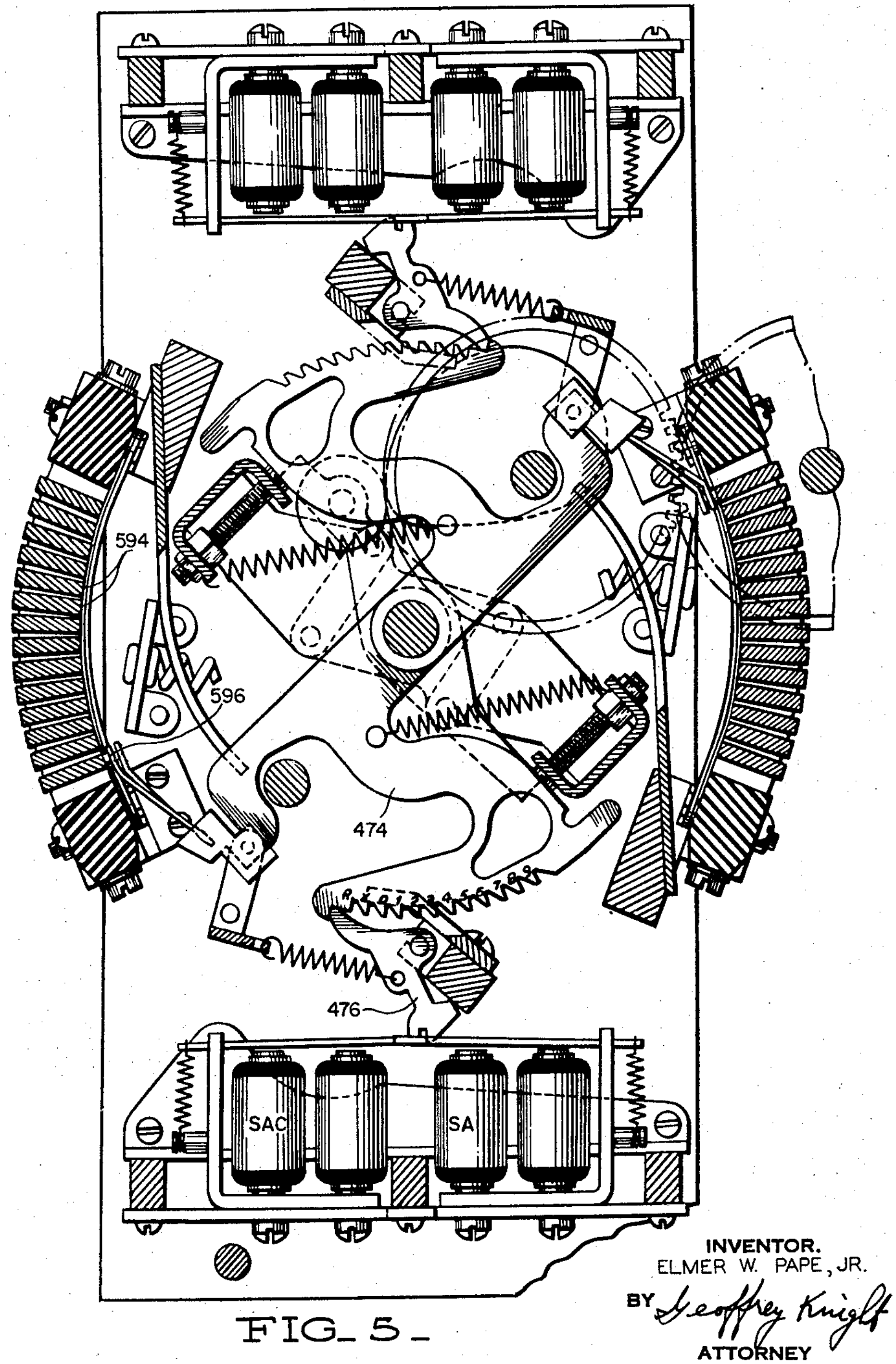
Fig. 5 is a sectional elevation view showing the storage mechanism.

For an understanding of the storage device, reference is directed to Fig. 5 where it is seen that sectors such as sector 474 are adjusted differentially and held by pawls 476 which are operated by magnets SA and SAC, the former being effective for storing the 9–1 or digital part of the alphabetic code data from the cards and the latter for storing the O, X, and R code portions of the alphabet data. Associated with each sector are storage contact devices or impulse emitting controls in the form of movable contact wipers 596 fastened to the ends of the sectors and movable into contact with different ones of the fixed commutator segments 594. These differentially set contacts are provided as an electrical setting means whereby regularly timed impulses may be directed through them to take off a reading of the address portions set up in storage to control grouped sets of printer wheels.

*Card feed*

The card feed unit as explained in detail in said Rabenda patent is arranged to feed cards, from a supply hopper, successively through a first read and a second read station. In Fig. 3 of the instant application, the card feed is diagrammatically shown and comprises a supply hopper in which the cards are placed and fed therefrom singly and in succession by means of well-known picker knives which are shown connected to a lever actuated by a magnet 64, the control of which is well explained in the patent. Each card is fed into a presensing station wherein a card lever 275 is encountered to close an associated contact 276 whereby various preliminary card feed control circuits, as described in detail in the patent, are completed in preparation for continuous card feeding operations. From the presensing station, the card is directed to the first read station from whence the card is then conveyed to the second read station. Upon emerging from the latter station, the card is directed into a stacker. The means for transporting the cards through the first and second read stations is effected by means of a gripping device schematically shown and controlled by a magnet 53, the circuits for which are explained in detail in the patent.

In the first and second read stations there are a plurality of sensing brushes 161 shown schematically in the wiring diagram of Fig. 7*a*. For purposes of simplification, one brush is shown associated with a particular field of the card and each is connected to an associated plug socket of which the first and twentieth positions corresponding respectively to the first and twentieth columnar position of each field are shown.

*The strip feeding means*

Figure 6:
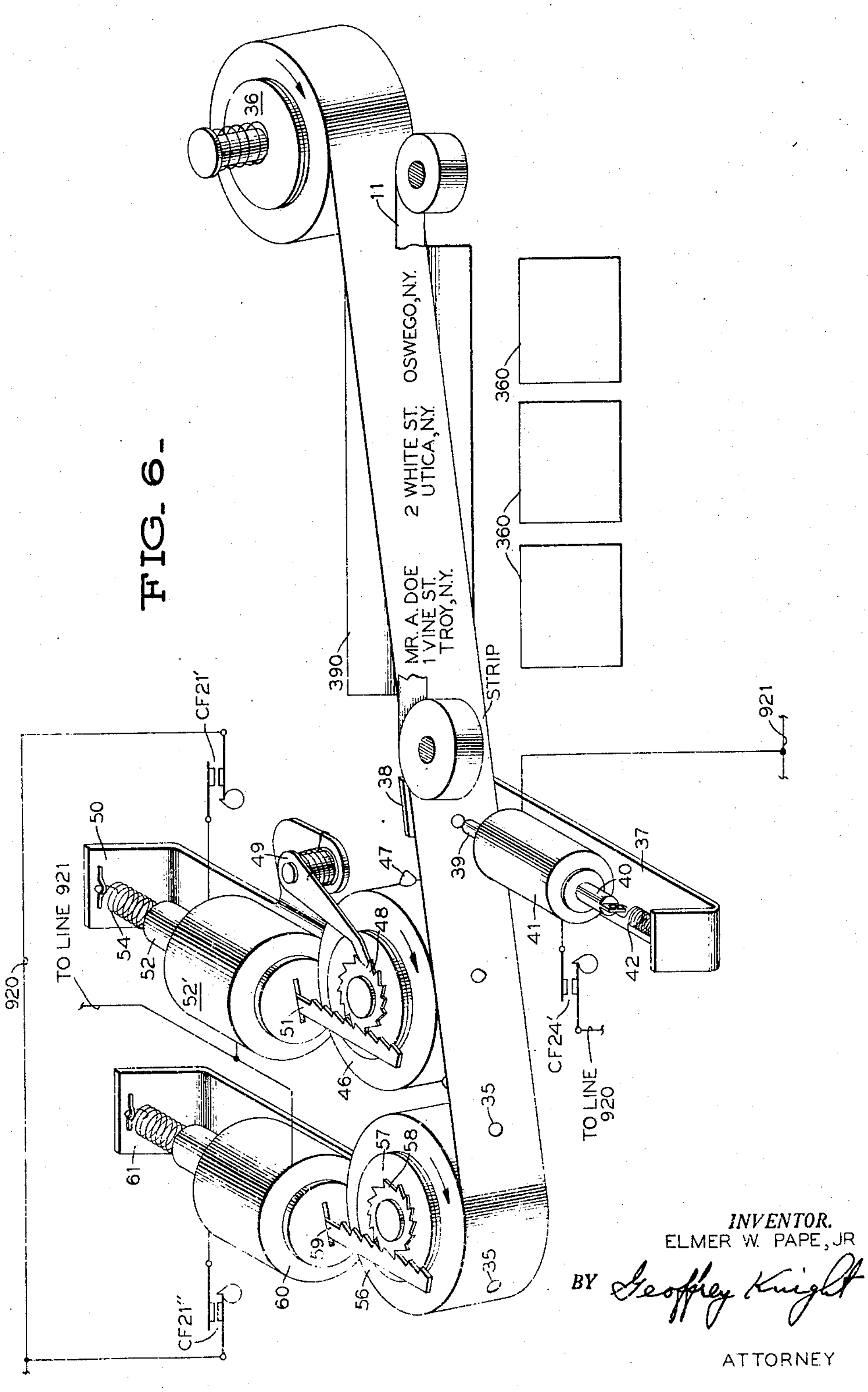
Fig. 6 is a perspective view showing the printing, punching and record feeding devices cooperating with the address strip.

The view in Fig. 6 shows in a diagrammatic fashion the punching and feeding devices cooperating with the strip. At the right end the supply reel or roll is provided with a spring-pressed clamp disc 36 for frictionally engaging the center of the supply roll so that the strip is held taut and prevented from being overthrown when the strip is drawn to the left.

After the strip passes at an angle through the space between the platen 390 and the ink ribbon 11, and in front of the several groups of print wheels 360, it is drawn through a punching device. This device is supported on a bracket 37, the rear wall 38 of which is formed with a die opening to receive the punch end 39 of a solenoid plunger 40. Surrounding the plunger is a solenoid 41 which is fastened to bracket 37. A spring 42 tends to hold the plunger 40 retracted normally with the punch out of the die. While the strip is stationary, i. e., before printing time, cam contacts CF24′ close in series with the solenoid 41 to energize it and thus slide the plunger 40 rearward to punch the strip.

After printing and punching have been effected, the strip is ready to be advanced to the left one sectional spacing to be positioned accurately in readiness for the printing of a new line of the several address parts. A sprocket wheel 46 is loosely mounted on a vertical pivot and formed with extending pins 47 spaced at thirdly intervals to engage the holes 35 formed in the strip by the punch. Since the wheel 46 is advanced an invariable distance on each feeding stroke, the strip is also fed accurately. A ratchet wheel 48 is fastened to the top of the pin feed sprocket wheel 46 and is formed with teeth numbered in a multiple of three. A spring-drawn retainer arm 49 is pivoted on the frame 50 and has a rounded end pressing in the ratchet teeth recesses to limit and hold the sprocket movement to an even amount of spacing. In order to drive the ratchet wheel 48 there is associated therewith a ratchet rack 51 which is the extension of the plunger 52 in the solenoid 52′. Cam contacts CF21′ are closed, solenoid 52′ is energized and plunger 52 is projected forward against the tension of spring 54 with the teeth of rack 51 ratcheting idly over the teeth on wheel 48. However, after the plunger is brought against a fixed stop (not shown) and the solenoid 52′ is de-energized when CF21′ cam contacts open, spring 54 pulls the plunger 52 back against another stop and during such movement the rack 51 rotates the ratchet wheel 48 and sprocket wheel 46 a third turn in a clockwise direction and thus the strip is advanced to the left for just one address portion length in an accurate fashion.

A takeup roll 56 is provided for winding the printed length of the strip after it leaves the printer, punch and feeder. Cooperating with the center of roll 56 are frictional discs 57, the top one bearing a ratchet wheel 58. As a driver for wheel 58, there is provided a ratchet rack plunger 59 in a solenoid 60 which is mounted on a bracket 61. Timed to operate shortly after the closure of contacts CF21′, cam contacts CF21″ are made effective to energize solenoid 60 and thus plunger rack 59 is extended and retracted to rotate roll 56 in the same fashion as the operation of sprocket wheel 46. As takeup roll 56 is turned impositively in a clockwise direction, it takes up whatever slack there is in the strip between the roll and sprocket wheel 46.

*Card analyzing or reading circuits*

The circuits whereby the perforated cards may be analyzed at the first reading station and the second reading station are shown in Fig. 31*g* of the Rabenda patent and are again repeated somewhat diagrammatically in part in Fig. 7*a* of the instant case. The sensing circuit for the first reading station is from the line side 920, circuit breaker contacts CB1—4, CF28 cam contacts, first reading relay R1630*b* contacts which are closed during the card analyzing time, to the brush 165 of the first column commutator. As explained in the Rabenda patent, the brush readout 165 makes successive contact with the contact points 164 and the circuit will be closed through the particular brush 161 which passes through the card perforation. Each analyzing brush 161 has a wire connection to a respective plug socket, from which a plug wire connection is made in the manner shown.

The sensing circuit for the second reading station extends from the CF28 cam contacts, thence through the second reading R1632*g* relay contacts, wire 992 to the brush readout 165. The circuit follows a path, in the manner described, to an associated plug socket from which a plug connection is made to the desired controls.

The CB1—4 circuit breaker contacts are timed to close and open at such times as it will prevent the arcing at the break and make between the brush readout and the contact points 164 so as to prevent damage at this point of contact. The construction and operation of circuit breaker contacts, such as are employed herein, are well known.

*Storage control circuits*

Referring to Fig. 7*a*, there are shown circuits associated with storage entry or read-in (R. I.) and storage exit or readout (R. O.) operations. The entry and exit controls are shown in detail only for storage unit A, while the entry and exit controls for storage units B are shown in block diagram form. Both of these storage units correspond to those indicated diagrammatically as S1′ and S2′ shown in Fig. 2.

The signal for initiating control activities is an impulse taken from a row of plug sockets labeled S. C. shown in Fig. 7*b*. This signal starts with line 920 and proceeds along line 920′, through CR163 cam contact to the S. C. plug sockets. For convenience, it is to be assumed that the impulse extends through certain pilot selection controls now considered to be adjusted to pass the signal into a storage entry control plug socket AR1, shown in the right-hand section of Fig. 7*b*, then through relay R836P2, line 921′ and finally line 921. This relay initiates storage control activities for storage unit A. A hold circuit for relay R836H extends through R836*a* contacts through CF20 cam contacts, line 920′ to line 920. Upon closure of R836*b* points and CF21 cam contacts, a circuit is completed to energize relays R837 and R840. The points of the latter relays are shown in the lower right-hand corner of Fig. 7*a* and control the entry of address data into the storage unit while a point of relay R836, namely R836*c*, controls the energization of the storage unit restoring magnet SRA in order to prepare the unit for mechanical operations. The circuit controlling the SRA magnet begins with line 920 and follows through CR59 cam contacts, R836*c* contacts, SRA magnet to line 921.

Address data is introduced into storage by means of plug wire connections to storage unit entry plug sockets such as 928*a*. Here positions 1 and 20 are shown in detail. In position 1 data is entered to energize the ratchet setup magnet SA by means of a circuit beginning with entry hub, position 1 and extending through R837*a*, R762*a*, setup magnet SA to line 921. The contacts R762*a* are under control of a parent relay energized by means of a circuit beginning with line 920 and extending through CR202 cam contacts, relays R762, R761 in series therewith, to line 921. Simultaneously, relays R765, R766, R769, R770, R773 and R774 are energized by means of the same circuit. These relays are used to control various associated points distributed throughout the entry and exit circuits in order to store the zone portions, O—X—R, forming a part of the alphabetic characters. The zone portion of an alphabetic character is admitted into storage by means of a circuit beginning with plug socket 928*a*, position 1 and extending through R837*a*, R762*a*, now transferred, through setup ratchet magnet SA' to the line 921.

In order to control the readout of data from storage unit A, it is necessary to energize storage exit control relays R828H, R829 and R832 all of which are shown in Fig. 7*b*. For the sake of convenience in this case, the S. C. impulse is assumed to enter an ARO plug socket and then continues through said relays R828H, R829 and R832, both wired in parallel with R828H, to line 921. Energization of these relays close associated points in the storage exit circuits of Fig. 7*a*. In reading data out of storage, for example the character A, two circuits are employed, one of which emits the numeric portion of the alphabetic character while a second circuit emits the zone portion of the alphabetic character. Since the combination of an R zone and a numeric 1 constitutes the character A, the 1 is read out by means of a circuit beginning with line 920 and extending through CB1—4, total print emitter, at one time of the cycle, then through an associated connecting wire leading to the one spot in the readout commutator of the storage unit, wiper 596, common bar 594, R761*a* normally closed contacts, R828*h* to the exit socket 941*a* number 1 position. The reading out of the zone portion, the R, for example, follows a somewhat similar path except that the R pulse is emitted at R time through the total print emitter and passes through wiper 596', common bar 594', R761*a*, now transferred, R828*h* to the same exit plug socket 941*a* position number 1. The readout of data from storage unit B, shown in block diagram form, is effected through associated plug sockets 941*b*. The entry of data into storage unit B, also shown in block diagram form, is effected through plug sockets 928*b*.

*Print magnet energizing circuits*

The circuits for energizing the print magnets identified as 361 are shown in Fig. 7*a*. Here the circuits are shown in detail only for two positions of printing group 1. The printing groups 2 and 3 are shown in block diagram form The address data is admitted into printing group 1 by way of plug sockets 940*c*, into printing group 2 by way of plug sockets 940*a* and into printing group 3 by way of plug sockets 940*b*. Two positions, namely, the first and the last of each printing group are shown and as earlier explained an entire field representing an address line is admitted into a plurality of these sockets for printing the various lines of address data on the strip.

The printing circuit operation may be described briefly by means of two circuits. The first circuit for energizing the print magnet determines the selection of a particular group of characters. The second circuit for energizing the same print magnet determines the particular character to be printed from the group of characters previously selected. The latter circuit controls the means for causing the printing to be affected on the address strip. The first of these two circuits in question is initiated when the numeric part of the alphabetic character is admitted to plug socket 940*c*. The circuit path then follows through the normally closed contacts of relay R933*a*, print magnet 361, position 1, contacts 165*a* normally closed, R1041*a* normally closed to line 921. The operation of contacts 165*a* is such that the transfer operation is accomplished without a break occurring in the circuit. This contact is under control of the print magnet and the operation is completely described in the Rabenda patent. It may be mentioned briefly that at the end of the numeric pulse the contacts 165*a* will be shifted to a transferred position to accept the next input pulse which incidentally is a zone pulse. The circuit for energizing the print magnet under control of a zone pulse begins by admitting the zone pulse at plug socket 940*c* and then following through R933*a*, print magnet 361, contacts 165*a*, now transferred, to line 921. In the case of a numeric character, a single pulse is admitted through the plug socket 940*c*. The numeric character is then selected for printing under control of the "N" pulse. The "N" pulse follows a path beginning with line 920 through CR104 cam contacts, R933*a*, now transferred, print magnet 361, contacts 165*a*, now transferred, to line 921. The contacts R933*a* are under control of a parent relay R933 shown in the upper right-hand corner of Fig. 7*a*.. The circuit for energizing relay R933 begins with line 920 then follows through CR20 cam contacts, relay R933 to line 921.

*Pilot selectors (switching means)*

The pilot selector is a well-known form of switching means which is generally controlled by a special perforation in a card when the latter is at the first read station and then closes contacts of the switch on the following card feed cycle. Referring to Fig. 7*b*, there are seen the detail circuits associated with pilot selector PS1, whereas pilot selector PS2 is shown in block diagram form. Each pilot selector is provided with an "X" plug socket which admits an "X" timed impulse, an "IMM" plug socket which when properly wired, operates the pilot selector immediately as opposed to the above-described operation of the selector, and a "D" plug socket which admits a wide variety of impulses. Since we are not concerned with the controls associated with the "X" and the "IMM" controls, we shall proceed with an explanation of the controls associated with the "D" plug socket which when connected to a signal such as a digit from a perforation in the card. For the instant case, there is provided a pilot selector control impulse, PSC, which is available at a PSC plug socket shown in the upper right-hand corner of Fig. 7*b*.

The admission of a pulse into the "D" plug socket of pilot selector PS1 causes relay R1513P2 to be energized. A hold circuit is immediately established for relay R1513H upon the closure of R1513*a* contacts in conjunction with CR30 cam contacts. Upon closure of R1513*b* in conjunction with CF31 cam contacts relay R1515P1 is energized. A hold circuit is established for relay R1515H upon closure of R1515*a* in conjunction with CF10 cam contacts. The relay R1515 is provided with transfer contacts, namely R1515*c*, R1515*d* and R1515*e*. Each of said transfer points is provided with a group of three plug sockets, namely, C, N and T. A pulse admitted into the "C" socket comes out of the "N" socket when the pilot selector is inoperative; but when the pilot selector is operated, as described, the pulse entering the "C" socket comes out of the "T" socket.

In the block PS2, a relay number R1518 is noted. This relay is controlled in a manner similar to the manner of control described for relay R1515, associated with pilot selector PS1 and accordingly, controls associated transfer contacts R1518*c* and R1518*d*.

*Contracting devices*

As already mentioned hereinabove, the contracting or shifting devices are the type shown in Fig. 2 of said Bryce patent. It may be seen the various circuits are under control of instrumentalities such as card levers, T cam contacts, and so forth. In the 407 tabulator of the present case, there are provided similar instrumentalities for operating card lever contacts and cam contacts. Accordingly, it may be appreciated that the instrumentalities in the 407 may be conveniently employed to operate and control the various portions of the circuit.

as constituted in Fig. 2 of said Bryce patent, and that such timing changes as may be necessary to conform with the cyclic timing of the 407 can be made without any difficulty. Since the general scheme of operation of name contraction has been earlier described, at this point we need only consider the points of entry and exit of the circuit so as to apply them to the instant case. In Fig. 2 of the Bryce patent, the input sockets 38, 44 are wired to sensing brushes U. B. and sensing brushes L. B., respectively. The output from this circuit is obtained at sockets 44 from which data is extracted in contracted form.

In Fig. 7*a* of the instant case, we find the same reference numbers employed to identify corresponding sockets of the name contracting devices NC1′ and NC2′. The plugging connections between these sockets and other sockets are diagrammatically shown. The foregoing explains the circuits associated with each unit. Now there is to be considered the plugging connections employed for interconnecting these various units whereby the various address portions sensed in the card feed of the tabulator are transmitted and recorded on the record strip.

*Plugging controls and operation*

Referring to Figs. 2 and 7*a* of the instant case, field 3, corresponding to city and state, is transmitted from the first read station by means of plug wire connections 120 to sockets 940*b*, positions 1 through 20 of printing group 3 wherein said address portion is printed.

Field 2, corresponding to street and number, is sensed in the first read station and conveyed by means of plug wire connections 121 into sockets 44 of name contracting device NC2′. On the following card feed cycle, field 2 is again read but from the second read station and conveyed by means of plug wire connections 122 into sockets 38 of the name contracting device NC2′, through the latter to sockets 22 and then by way of plug wire connections 123 to sockets 940*a*, positions 1 through 20, of printing group 2.

Field 1, corresponding to the name, is sensed at the first read station and conveyed by means of plug wire connections 133 to sockets 44 of the name contracting device NC1′. On the following card cycle, the same data is sensed from the second read station and conveyed by means of plug wire connections 124 into sockets 38 of the name contracting device NC1′, through the latter to sockets 22 and then by way of split wire connections 301 to sockets 928*a*, positions 1 through 20 of storage entry A. By means of parallel split wire paths, the same data is wired to sockets 928*b*, positions 1 through 20 of storage entry B. In spite of the parallel connections to both storage units, it will be shown later on how alternating switching controls are affected by means of the pilot selectors to cause the storage devices to be responsive on alternate cycles of operation, not only for entry operations but for exit operations.

The plug wire connections for readout of the data from the storage units A and B comprises plug wire connections 302, 303, 304 and 305. The connections 303 and 304 provide a common path between corresponding sockets of the storage units, positions 1 through 20. The connections 302 and 305 provide paths whereby the data is transmitted to printing group 1, sockets 940*c*, positions 1 through 20.

The plug wire connections for affecting the entry and exit control over the storage units by means of the pilot selectors will now be considered. Referring to Fig. 7*b*, the plug wire connections 306 and 307 provide a path whereby the pilot selector control impulse PSC is directed to energize the pilot selector PS1 and to cause the associated transfer points, namely, R1515*c*, R1515*d* and R1515*e* to be operated on alternate cycles. The circuit for energizing pilot selector PS1 follows a path which includes "D" socket of PS1, plug wire 307, R1515*c*, normally closed contact points, plug wire 306 to the PSC socket and from there to line 920 in the manner described.

Pilot selector PS2 is energized upon the transfer of R1515*c* transfer contacts by means of a circuit which includes plug wire 306, R1515*c* normally open contact points, plug wire 308 to the "D" socket of PS2. The latter controls the energization of relay R1518 which in turn controls its associated transfer contacts, namely, R1518*c* and R1518*d*.

The circuit for causing the storage entry A to be responsive follows a path beginning with socket AR1, plug wire 313, R1518*c* normally open contact points, plug wire 310, socket SC, CR163 cam contacts, wire 920′ to line 920. The energization of storage entry A enables the latter to admit address data corresponding to A1, C1 and E1 shown in the chart of Fig. 2.

The circuit for causing storage entry B to be responsive follows a path beginning with BR1, plug wire 314, R1515*e* normally open contact points, plug wire 309 to socket SC. Energization of this storage unit enables the latter to admit address data corresponding to B1 and C1 in the chart of Fig. 2.

The circuit for causing the release of stored data from storage exit A begins with socket ARO, plug wire 315, R1515*d* normally open contact points, plug wire 318 to socket SC. Energization of this storage unit causes the release of address data corresponding to A1, C1 and E1 in the cycle shown in the chart of Fig. 2.

The circuit for causing the release of stored data from storage exit B begins with socket BRO, plug wire 312, R1518*d* normally open contact points, plug wire 311 to socket SC. Energization of this storage unit causes the release of address data corresponding to B1 and C1 in the cycles indicated in the chart of Fig. 2.

As a result of the above controls and operations, it may be appreciated that complete addresses are produced at the rate of one per printing cycle of the machine. The first completed address in the chart of Fig. 2 comprises the parts A1, A2′ and A3′. In Fig. 6 these parts correspond to the completed address, namely:

Mr. A. Doe
1 Vine Street
Troy, New York

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for recording data on parts of a strip, a plurality of groups of settable recording devices arranged to record along a common recording line and spaced at regular intervals along said line, entering means for the data to be recorded on said strip, means for setting a group of said recording devices under control of certain of said entering means, means for setting another group of said recording devices under control of others of said entering means, a plurality of storage devices operated under control of still others of said entering means for holding certain of said entered data, means for setting still another group of said recording devices under control of said storage devices, means for alternating the connections of said storage devices so that while some are operated by the entering means, others are controlling the setting of a related group of recording devices, means for feeding the strip diagonally downward across the recording line step by step to bring separate strip parts successively before each group of recording devices, and means for operating said recording devices simultaneously between operations of said feeding means to record on a plurality of strip parts different lines of different data and successively on different lines of each strip part by said groups of recording devices.

2. In a record controlled machine for recording multiple line addresses on portions of a strip, each of said records bearing fields representing a plurality of name, street, city and state parts of an address, means including a succession of sensing stations for sensing said fields on a plurality of said records simultaneously, a plurality of sets of settable recording elements arranged to record along a common recording line and spaced at regular intervals along said line, with each set having the same number of elements and with all sets equally spaced, means under control of said sensing means and different sensing stations for adjusting sets of recording elements to represent respectively the city and state, and the number and street of different addresses, a plurality of storage devices operated under control of the sensing means in one of said sensing stations for storing the name part of the addresses, means for alternating the connections of said storage devices so that while some are operated by the related sensing means, others are controlling the setting of a related group of recording devices for recording the name part of an address, means for feeding said strip diagonally downward across the recording line to shift strip portions over and downward so that a line of recording thereon is line spaced in movement from one of said sets of elements to the next, and means for operating said sets of adjusted recording elements successively for recording a line of different address parts of different addresses, each recording operation recording city and state on one strip portion, number and street on the next portion, and name on a third adjacent portion, whereby, starting with the third recording cycle of the machine, successive recordings and diagonal shifts of the strip result in the recording of one address for each recording operation of the machine.

3. In a machine for recording on parts of a strip under control of records bearing fields of data, at least one of said fields being subdivided into at least two subfields between which are unrecorded areas varying with each record card; means for sensing said fields and said subfields on said records at a succession of sensing stations; a plurality of sets of settable recording elements arranged to record along a common recording line and spaced at regular intervals along said line, with each set having the same number of elements and with all sets spaced similarly from adjacent sets; data shifting means under control of the subfield sensing means at different stations for providing at the output thereof the data in reshifted form; means under control of said output for adjusting a set of recording elements in accordance with the reshifted data; means under control of other field sensing means for adjusting other sets of recording elements; means for feeding said strip diagonally across the recording line at such an angle that when the strip is spaced from one set of recording elements to the next, the recorded line thereon is lowered one line space; and means for operating said sets simultaneously to record therefrom on each part of the strip.

4. In a record controlled machine for recording multiple line addresses on parts of a strip, each record bearing fields of data representing respectively the name, number and street, city and state; a plurality of sensing stations arranged in succession and provided with groups of sensing means adapted to sense different fields on different records simultaneously; means for feeding said records one at a time in succession to said sensing stations; a plurality of sets of settable recording elements arranged to record along a common recording line and spaced at regular intervals along said line with each set having the same number of elements and with all sets spaced similarly from adjacent sets; means under control of one group of sensing means for adjusting one set of recording elements in accordance with city and state data; means under control of a second group of sensing means for adjusting a second set of recording elements in accordance with number and street data; a plurality of groups of storage means operated under control of a third group of sensing means for storing name data; means for alternating the control of said storage means so that while one group is operated by said third group of sensing means, another group is controlling the setting of a third set of recording elements; means for feeding said strip diagonally downward across the recording line to shift strip portions over and downward so that a line of recording thereon is line spaced in movement from one of said sets of elements to the next; and means for operating said sets of adjusted recording elements successively for recording a line of different address parts of different addresses, each recording operation recording city and state on one strip portion, number and street on the next portion, and name on a third adjacent portion, whereby successive recordings and diagonal shifts of the strip result in the recording of one address per each recording operation of the machine.

5. In a record controlled machine for recording multiple line addresses on parts of a strip, each record bearing fields of data representing respectively the name, number and street, city and state, said name field including subfields corresponding to first name and surname between which are unrecorded areas varying with each record, said number and street field including appropriate subfields between which are unrecorded areas varying with each record; a plurality of sensing stations arranged in succession including appropriate groups of sensing means for sensing said fields and said subfields on different records simultaneously; means for feeding said records one at a time in succession to said sensing stations; a plurality of sets of settable recording elements arranged to record along a common recording line and spaced at regular intervals along said line with each set having the same number of elements and with all sets spaced similarly from adjacent sets; means under control of a group of sensing means for adjusting a set of recording elements in accordance with city and state data; shifting means, under control of appropriate subfield sensing means at different stations, for providing at the output thereof said number and street in reshifted form; means under control of said output for adjusting a second set of recording elements in accordance with the reshifted number and street; shifting means under control of appropriate subfield sensing means at different stations for providing at the output thereof said names in reshifted form; a plurality of groups of storage means operated under control of said last-named output for storing the name in reshifted form; means for alternating the control of said groups of storage means so that while one group is operated by said last-named output, another group is controlling the setting of the third set of recording elements; means for feeding said strip diagonally downward across the recording line to shift strip portions over and downward so that a line of recording thereon is line spaced in movement from one of said sets of elements to the next; and means for operating said sets of adjusted recording elements for recording a line of different address parts of different addresses, each recording operation recording city and state on one strip portion, number and street on the next portion, and name on a third adjacent portion, whereby successive recordings and diagonal shifts of the strip result in the recording of one address per recording operation of the machine.

6. A method of recording multiple lines of data on a strip diagonally fed across the recording line of a single line recorder and under control of multiline data bearing records, comprising the steps of arranging the recording elements into equally spaced sets; scanning successive records simultaneously for certain data destined for immediate recording and other data for subsequent recording;

adjusting at least one of said sets with said certain data; reorganizing the other scanned data prior to adjusting at least another of said sets with the reorganized data; impressing simultaneously the adjusted sets to cause recordings of organized and reorganized data on different strip parts; advancing the strip diagonally downward across the printing line so as to present unrecorded portions of said different recorded strip parts to said sets whereby on successive recording and strip feeding operations a recorded strip part bearing multiple lines of organized and reorganized data is produced at the rate of one per each recording operation.

References Cited in the file of this patent

UNITED STATES PATENTS

| | | |
|---|---|---|
| 1,745,994 | Hubbard | Feb. 4, 1930 |
| 1,954,041 | Daly | Apr. 10, 1934 |
| 2,168,364 | Schaefer | Aug. 4, 1939 |
| 2,202,958 | McFarland | June 4, 1940 |
| 2,240,667 | Paris | May 6, 1941 |
| 2,566,932 | Dayger | Sept. 4, 1951 |
| 2,568,829 | Rabenda | Oct. 2, 1951 |
| 2,580,729 | Carroll | Jan. 1, 1952 |